United States Patent
Zhang

(10) Patent No.: US 10,484,143 B2
(45) Date of Patent: Nov. 19, 2019

(54) METHOD AND DEVICE FOR SHORT-LATENCY COMMUNICATIONS IN UE AND BASE STATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/118,451

(22) Filed: Aug. 31, 2018

(65) Prior Publication Data

US 2018/0375620 A1 Dec. 27, 2018

Related U.S. Application Data

(63) Continuation of application No. PCT/CN2017/075296, filed on Mar. 1, 2017.

(30) Foreign Application Priority Data

Mar. 3, 2016 (CN) .......................... 2016 1 0121604

(51) Int. Cl.
*H04L 1/18* (2006.01)
*H04L 1/16* (2006.01)
(Continued)

(52) U.S. Cl.
CPC .............. *H04L 1/1812* (2013.01); *H04L 1/16* (2013.01); *H04W 72/042* (2013.01); *H04W 72/0446* (2013.01); *H04W 88/02* (2013.01)

(58) Field of Classification Search
CPC ...... H04L 1/1812; H04L 1/16; H04W 72/042; H04W 72/0446; H04W 88/02
See application file for complete search history.

(56) References Cited

U.S. PATENT DOCUMENTS

| 7,912,982 | B2 * | 3/2011 | Murphy | ................ | H04W 40/14 |
| | | | | | 455/445 |
| 2007/0245201 | A1 * | 10/2007 | Sammour | ............. | H04L 1/1628 |
| | | | | | 714/748 |

(Continued)

FOREIGN PATENT DOCUMENTS

| CN | 101192896 A | 6/2008 |
| CN | 101414900 A | 4/2009 |

(Continued)

*Primary Examiner* — Ivan O Latorre
(74) *Attorney, Agent, or Firm* — Maschoff Brennan

(57) ABSTRACT

The disclosure provides a method and a device for reducing latency in radio communications. A User Equipment (UE) first receives K radio signal groups and then transmits an uplink signaling, K being a positive integer greater than 1 and the uplink signaling including HARQ-ACK information, wherein lengths of Enhanced Transmission Time Intervals (eTTIs) corresponding to the K radio signal groups correspond to K time lengths respectively, and any two time lengths of the K time lengths are not equal. The HARQ-ACK information indicates whether a coding block in the K radio signal groups is correctly decoded. The numbers of radio signals in the K radio signal groups are $Q_1, \ldots, Q_K$ respectively, the $Q_1, \ldots, Q_K$ being positive integers respectively. The disclosure avoids the occurrence that the UE transmits multiple uplink signalings simultaneously, and improves the robustness of HARQ-ACK under power limited conditions. In addition, the disclosure reduces radio overhead and increases transmission efficiency.

18 Claims, 6 Drawing Sheets

(51) Int. Cl.
*H04W 72/04* (2009.01)
*H04W 88/02* (2009.01)

(56) References Cited

U.S. PATENT DOCUMENTS

| | | | |
|---|---|---|---|
| 2011/0055652 A1* | 3/2011 | Park | H04L 1/1819 714/748 |
| 2014/0071954 A1* | 3/2014 | Au | H04W 72/0446 370/336 |
| 2014/0362832 A1* | 12/2014 | Rudolf | H04L 1/1822 370/336 |
| 2016/0233990 A1* | 8/2016 | Yan | H04L 1/08 |
| 2016/0262101 A1* | 9/2016 | Nammi | H04W 72/0446 |
| 2016/0295584 A1* | 10/2016 | Chen | H04W 72/0446 |
| 2018/0076942 A1* | 3/2018 | Nory | H04L 5/0055 |
| 2018/0132242 A1* | 5/2018 | Li | H04L 5/14 |
| 2018/0176938 A1* | 6/2018 | Shao | H04W 72/0493 |
| 2018/0310282 A1* | 10/2018 | Shi | H04W 72/042 |
| 2018/0317250 A1* | 11/2018 | Yi | H04W 72/1289 |
| 2018/0359068 A1* | 12/2018 | Kim | H04W 72/0446 |
| 2019/0007175 A1* | 1/2019 | Kwak | H04L 5/00 |
| 2019/0132837 A1* | 5/2019 | Yi | H04L 5/00 |
| 2019/0173651 A1* | 6/2019 | Zhang | H04L 5/0055 |

FOREIGN PATENT DOCUMENTS

| | | |
|---|---|---|
| CN | 101431950 A | 5/2009 |
| CN | 101978636 A | 2/2011 |
| CN | 103002506 A | 3/2013 |
| CN | 103580822 A | 2/2014 |
| CN | 104919888 A | 9/2015 |
| EP | 2451206 A1 | 5/2012 |

\* cited by examiner

METHOD AND DEVICE FOR SHORT-LATENCY COMMUNICATIONS IN UE AND BASE STATION

CROSS-REFERENCE TO RELATED APPLICATION

This application is continuation of International Application No. PCT/CN2017/075296, filed on Mar. 1, 2017, and claims benefit to Chinese Patent Application No. CN 201610121604.0, filed on Mar. 3, 2016, all of which is hereby incorporated by reference for all purposes. The International Application was published in China on Sep. 8, 2017 as WO2017148381A1 under PCT Article 21 (2).

BACKGROUND

Technical Field

The present disclosure relates to transmission schemes in wireless communication systems, and in particular to a method and a device for short-latency transmission based on cellular network systems.

Related Art

At the 3rd Generation Partner Project (3GPP) Radio Access Network (RAN) #63 plenary session, the subject of reducing the delay of the Long Term Evolution (LTE) network was discussed. The delay of the LTE network includes radio delay, signal processing delay, transmission delay between nodes, and the like. With the upgrade of wireless access networks and core networks, transmission delay is effectively reduced. With the application of new semiconductors having higher processing speeds, the signal processing delay is significantly reduced.

In LTE, Transmission Time Interval (TTI) or subframe or Physical Resource Block (PRB) pair corresponds to one milli-second (ms) in time. One LTE subframe includes two timeslots, which are a first timeslot and a second timeslot respectively. A Physical Downlink Control Channel (PDCCH) occupies the former R Orthogonal Frequency Division Multiplexing (OFDM) symbols of a PRB pair; wherein R is a positive integer not greater than 4 and is configured by a Physical Control Format Indicator Channel (PCFICH). As for Frequency Division Duplex (FDD) LTE, a Hybrid Automatic Repeat request (HARQ) has a Round Trip Time of 8 ms. Thus, a few HARQ repeats would result in dozens of milli-seconds of network delay. Therefore, reducing radio delay becomes an effective means to reduce the LTE network delay.

SUMMARY

In order to reduce radio delay, one intuitive method is to apply a short TTI, for example, a TTI of 0.5 ms. The inventor finds through research that the length of the TTI is just one of the factors contributing to the radio delay and the delay caused by an uplink HARQ-ACK up to 1 ms also significantly impacts the radio delay. The inventor finds through further research that downlink data probably corresponds to TTIs/short TTIs of various lengths. One intuitive method is to feed back independent HARQ-ACKs for the short TTIs of various lengths. However, the intuitive method is likely to influence the receiving performance of the HARQ-ACK under power limited conditions.

The present disclosure provides a solution in view of the above problem. It should be noted that embodiments in the UE of the present disclosure and the characteristics in the embodiments may be applied to the base station if no conflict is caused, and vice versa. Further, the embodiments of the present disclosure and the characteristics in the embodiments may be mutually combined if no conflict is caused.

The present disclosure provides a method in a UE supporting short-latency radio communications. The method includes the following steps:

receiving K radio signal groups, K being a positive integer greater than 1; and transmitting an uplink signaling, the uplink signaling including HARQ-ACK information.

Herein, lengths of Enhanced Transmission Time Intervals (eTTIs) corresponding to the K radio signal groups correspond to K time lengths respectively, and any two time lengths of the K time lengths are not equal; the HARQ-ACK information indicates whether a coding block in the K radio signal groups is correctly decoded; the numbers of radio signals in the K radio signal groups are $Q_1, \ldots, Q_K$ respectively, the $Q_1, \ldots, Q_K$ being positive integers respectively.

The essence of the above method is that a downlink data associated with the HARQ-ACK in an uplink signaling can correspond to various eTTI lengths. The above method avoids the occurrence that the UE transmits multiple uplink signalings simultaneously and improves the robustness of HARQ-ACK under power limited conditions.

In one embodiment, the act that the lengths of the eTTIs corresponding to the K radio signal groups correspond to K time lengths respectively refers that: the radio signals in the K radio signal groups are transmitted to a physical layer by a Medium Access Control (MAC) layer within the durations of the K time lengths respectively.

In one embodiment, the coding block can be transmitted to the physical layer by the MAC layer once per eTTI.

In one embodiment, the duration of the eTTI is not greater than 1 ms but not less than 2192 Ts, the Ts being $1/30720$ ms.

In one embodiment, the duration of the eTTI is one of {1 ms, 0.5 ms, ¼ ms, 2/7 ms, 3/14 ms, 1/7 ms, 1/14 ms}.

In one embodiment, the duration of the eTTI is one of {1 ms, 0.5 ms, 8768 Ts, 6576 Ts, 4384 Ts, 2192 Ts}, the Ts being $1/30720$ ms.

In one embodiment, the uplink signaling is a physical signaling.

In one embodiment, Uplink Control Information (UCI) corresponding to the uplink signaling includes an information bit and a check bit, the check bit is generated according to the information bit, and the HARQ-ACK information is indicated by the check bit.

In one embodiment, the coding block is a Transport Block (TB).

In one embodiment, if one radio signal group includes multiple radio signals, any two radio signals of the multiple radio signals are transmitted in two orthogonal (non-overlapping) time intervals respectively or transmitted on two carriers respectively.

In one embodiment, one radio signal includes one or two coding blocks.

In one embodiment, the K radio signal groups include at least two radio signals, and the coding blocks included in the two radio signals are different in number.

In one embodiment, in the K time lengths, the maximum time length is less than or equal to 1 ms, and the minimum time length is greater than or equal to the duration of one OFDM symbol including a CP. In one subembodiment, for a common CP, the duration of one OFDM symbol including the CP is 2192 Ts, the Ts being $\frac{1}{30720}$ ms.

In one embodiment, a first time length and a second time length are any two time lengths of the K time lengths; if the first time length is greater than the second time length, the start time of the transmission of the radio signal corresponding to the first time length is earlier than the start time of the transmission of the radio signal corresponding to the second time length.

In one embodiment, a first time length and a second time length are any two time lengths of the K time lengths; if the first time length is greater than the second time length, the end time of the transmission of the radio signal corresponding to the first time length is earlier than the end time of the transmission of the radio signal corresponding to the second time length.

Specifically, according to one aspect of the present disclosure, the K radio signal groups are transmitted in K time windows respectively, and any two time windows of the K time windows are orthogonal (non-overlapping) in time domain.

In the above aspect, the time windows corresponding to the radio signals corresponding to various eTTI lengths are non-overlapping.

In one embodiment, the duration of the time window is one of {1 ms, 0.5 ms, 8768 Ts, 6576 Ts, 4384 Ts, 2192 Ts}, Ts being $\frac{1}{30720}$ ms.

Specifically, according to one aspect of the present disclosure, the method includes the following steps:

conducting blind decoding in L time windows, and receiving K downlink signaling groups in the L time windows.

Herein, L is a positive integer; the numbers of downlink signalings in the K downlink signaling groups are $Q_1, \ldots, Q_K$ respectively; the K downlink signaling groups and the K radio signal groups are in one-to-one correspondence; the downlink signaling in the downlink signaling group and the radio signal in the corresponding radio signal group are in one-to-one correspondence; and the downlink signaling includes scheduling information of the corresponding radio signal, and the scheduling information includes at least one of {Modulation and Coding Status (MCS), New Data Indicator (NDI), Redundancy Version (RV), Transport Block Size (TBS)}.

The essence of the above aspect is that the time window occupied by the downlink signaling associated with the HARQ-ACK information is determined by default (that is, signaling configuration is not required). Compared with the method in which the time window is configured through a high-layer signaling or physical layer signaling, the above aspect reduces radio overhead and increases transmission efficiency. Further, determining the time window by default can avoid the uncertainty of the decoding time of the UE, thereby reducing the implementation complexity of the decoding module in the UE.

In one embodiment, L is greater than 1.

In one embodiment, the L time windows belong to L LTE subframes respectively.

In one embodiment, the L time windows belong to L LTE timeslots respectively.

In one embodiment, the HARQ-ACK information further indicates whether one or more coding blocks scheduled by a semi-static scheduling signaling are correctly decoded. The semi-static scheduling signaling is a physical layer signaling identified by an SPS-RNTI.

In one embodiment, the HARQ-ACK information further indicates whether a semi-static scheduling signaling used for radio resource release is correctly decoded. The semi-static scheduling signaling is a physical layer signaling identified by an SPS-RNTI.

In one embodiment, L is less than K.

In one embodiment, L is equal to K.

In one embodiment, one eTTI group consists of an eTTI.

In one embodiment, radio signals scheduled by the downlink signaling blind decoded in the L time windows are one-to-one corresponding to L time length sets, one time length set includes at least one time length, any two of the L time length sets have different time lengths. A first set is a subset of a second set. The first set is a set consisting of K time lengths, and the second set is a set consisting of the time lengths in the L time length sets.

In one embodiment, the downlink signalings in the K downlink signaling groups are all physical layer signalings.

In one embodiment, part of the downlink signalings in the K downlink signaling groups are physical layer signalings, and the rest are high-layer signalings.

Specifically, according to one aspect of the present disclosure, the downlink signaling is a physical layer signaling, and the downlink signaling further includes HARQ auxiliary information. The given HARQ auxiliary information indicates a cumulative number of the downlink signaling associated with the radio signal in a target time window set and DCIs indicating SPS release. The target time window set is a set of all the time windows having an end time not later than an end time of a given time window in the L time windows, and the given time window is a time window occupied by the HARQ auxiliary information.

In the above aspect, the HARQ auxiliary information can prevent the base station and the UE having discrepant understandings of HARQ-ACK information because the UE misses the downlink signaling. The HARQ auxiliary information can indicate the number of information bits corresponding to the HARQ-ACK information.

In one embodiment, the HARQ auxiliary information indicates a remainder obtained when X is divided by Y, wherein X is the number of all target DCIs transmitted by the base station in the target time window set, and Y is a positive integer. The target DCI includes {the downlink signaling associated with the radio signal (that is, the downlink signaling used for scheduling the corresponding radio signal), DCI indicating SPS release}. In one subembodiment, if the UE correctly receives all the downlink signalings in the target time window and there is no DCI indicating SPS release in the target time window, X is equal to the sum of $Q_1, \ldots Q_K$. In one subembodiment, Y is 4. In one subembodiment, Y is 8. In one subembodiment, Y is a constant.

Specifically, according to one aspect of the present disclosure, the method includes the following steps:

receiving a high-layer signaling, wherein at least the former one of {a length of the time interval occupied by the uplink signaling, a time domain resource occupied by the uplink signaling} is determined according to the high-layer signaling.

In the above aspect, the base station can select a time interval of an appropriate length for the uplink signaling according to multiple eTTIs currently configured to the UE. If the length of the time interval is too large, the transmission delay will be relatively greater. If the length of the time interval is too small, the transmission efficiency probably will be reduced (for example, the proportion occupied by a demodulation reference signal probably is too high). The above aspect can balance the delay and the transmission efficiency.

In one embodiment, the length of the time interval occupied by the uplink signaling is the number of SC-FDMA symbols occupied by the uplink signaling.

In one embodiment, the high-layer signaling is an Radio Resource Control (RRC) signaling.

In one embodiment, the time interval occupied by the uplink signaling includes {the time domain resource occupied by the uplink signaling, the time domain resource occupied by an uplink demodulation reference signal associated with the uplink signaling}.

In one embodiment, the high-layer signaling indicates W candidate time domain resources located in a subframe, the time domain resource occupied by the uplink signaling is one of the W candidate time domain resources, the length of the time interval occupied by the uplink signaling is the duration of the time domain resource occupied by the uplink signaling, and W is a positive integer greater than 1. In one subembodiment, the candidate time domain resources include a positive integer number of consecutive SC-FDMA symbols. In one subembodiment, the index of the time domain resource occupied by the uplink signaling in the W candidate time domain resources is determined by the time domain resource occupied by the K radio signal groups.

Specifically, according to one aspect of the present disclosure, a maximum eTTI length that the radio signal associated with the HARQ-ACK information can support is related to a position of a time domain resource occupied by the uplink signaling in an LTE subframe.

In one embodiment, the time interval occupied by the uplink signaling is the last one of the multiple time intervals that can be used for transmitting the HARQ-ACK information in an LTE subframe, and the maximum eTTI length that the radio signal associated with the HARQ-ACK information can support is 1 ms.

In the above embodiment, a radio signal corresponding to the traditional TTI of 1 ms is associated to the HARQ-ACK information located at the tail of the LTE subframe, and the HARQ-ACK information located at other positions of the LTE subframe can be used for indicating a radio signal corresponding to a short TTI. The above embodiment reduces the transmission delay of the radio signals corresponding to short TTIs.

In one embodiment, the time interval occupied by the uplink signaling is the first one of the multiple time intervals that can be used for transmitting the HARQ-ACK information in an LTE subframe, and the maximum eTTI length that the radio signal associated with the HARQ-ACK information can support is 1 ms.

In one embodiment, the time interval occupied by the uplink signaling is the first one of the multiple time intervals that can be used for transmitting the HARQ-ACK information in an LTE subframe, and the maximum eTTI length that the radio signal associated with the HARQ-ACK information can support is 0.5 ms.

In the above embodiment, a radio signal corresponding to the traditional TTI of 1 ms is associated to the HARQ-ACK information located at the head of the LTE subframe, and the HARQ-ACK information located at other positions of the LTE subframe can be used for indicating a radio signal corresponding to a short TTI. According to the HARQ-ACK feedback delay corresponding to the downlink data of the eTTI less than 0.5 ms, the OFDM symbol corresponding to the HARQ-ACK information at the head of the LTE subframe probably is used for a PDCCH. Therefore, the above two embodiments facilitate the implementation of load balancing on a channel used for transmitting HARQ-ACK information in a subframe.

Specifically, according to one aspect of the present disclosure, a minimum eTTI length that the radio signal associated with the HARQ-ACK information can support is not related to a position of a time interval occupied by the uplink signaling in an LTE subframe.

In one embodiment, the minimum eTTI length that the radio signal associated with the HARQ-ACK information can support is the duration of one OFDM symbol.

The present disclosure provides a method in a base station supporting short-latency radio communications. The method includes the following steps:

transmitting K radio signal groups, K being a positive integer greater than 1; and receiving an uplink signaling, the uplink signaling including HARQ-ACK information.

Herein, lengths of eTTIs corresponding to the K radio signal groups correspond to K time lengths respectively, and any two time lengths of the K time lengths are not equal. The HARQ-ACK information indicates whether a coding block in the K radio signal groups is correctly decoded. The numbers of radio signals in the K radio signal groups are $Q_1, \ldots, Q_K$ respectively, the $Q_1, \ldots, Q_K$ being positive integers respectively.

In one embodiment, the transmission channel corresponding to the radio signal is a Downlink Shared Channel (DL-SCH).

In one embodiment, the physical layer channel corresponding to the radio signal is a Physical Downlink Shared Channel (PDSCH) or Short-Latency PDSCH (SPDSCH).

Specifically, according to one aspect of the present disclosure, the K radio signal groups are transmitted in K time windows on one same carrier respectively, and any two time windows of the K time windows are orthogonal in time domain.

Specifically, according to one aspect of the present disclosure, the method includes the following steps:

transmitting K downlink signaling groups in L time windows.

Herein, L is a positive integer. The numbers of downlink signalings in the K downlink signaling groups are $Q_1, \ldots, Q_K$ respectively. The K downlink signaling groups and the K radio signal groups are in one-to-one correspondence. The downlink signaling in the downlink signaling group and the radio signal in the corresponding radio signal group are in one-to-one correspondence. The downlink signaling includes scheduling information of the corresponding radio signal, and the scheduling information includes at least one of {MCS, NDI, RV, TBS}.

Specifically, according to one aspect of the present disclosure, the downlink signaling is a physical layer signaling, and the downlink signaling further includes HARQ auxiliary information. The given HARQ auxiliary information indicates a cumulative number of the downlink signaling associated with the radio signal in a target time window set and DCIs indicating SPS release. The target time window set is a set of all the time windows having an end time not later than an end time of a given time window in the L time windows, and the given time window is a time window occupied by the HARQ auxiliary information.

Specifically, according to one aspect of the present disclosure, the method includes the following steps:

transmitting a high-layer signaling, wherein at least the former one of {a length of the time interval occupied by the uplink signaling, a time domain resource occupied by the uplink signaling} is determined according to the high-layer signaling.

In one embodiment, the length of the time interval occupied by the uplink signaling is the duration of one OFDM symbol (including CP).

In one embodiment, the length of the time interval occupied by the uplink signaling is the duration of two OFDM symbols (including CP).

In one embodiment, the length of the time interval occupied by the uplink signaling is the duration of three or four OFDM symbols (including CP).

In one embodiment, the length of the time interval occupied by the uplink signaling is 0.5 ms.

Specifically, according to one aspect of the present disclosure, a maximum eTTI length that the radio signal associated with the HARQ-ACK information can support is related to a position of a time domain resource occupied by the uplink signaling in an LTE subframe.

Specifically, according to one aspect of the present disclosure, a minimum eTTI length that the radio signal associated with the HARQ-ACK information can support is not related to a position of a time interval occupied by the uplink signaling in an LTE subframe.

Specifically, the minimum eTTI length that the radio signal associated with the HARQ-ACK information can support is the duration of one OFDM symbol.

The present disclosure provides a UE supporting short-latency radio communications. The UE includes the following modules:

a first receiving module, to receive K radio signal groups, K being a positive integer greater than 1; and a first transmitting module, to transmit an uplink signaling, the uplink signaling including HARQ-ACK information.

Herein, lengths of eTTIs corresponding to the K radio signal groups correspond to K time lengths respectively, and any two time lengths of the K time lengths are not equal. The HARQ-ACK information indicates whether a coding block in the K radio signal groups is correctly decoded. The numbers of radio signals in the K radio signal groups are $Q_1, \ldots, Q_K$ respectively, the $Q_1, \ldots, Q_K$ being positive integers respectively.

In one embodiment, the above UE is characterized in that the first receiving module is further configured to perform at least one of the following:

conducting blind decoding in L time windows, and receiving K downlink signaling groups in the L time windows; and receiving a high-layer signaling, wherein at least the former one of {a length of the time interval occupied by the uplink signaling, a time domain resource occupied by the uplink signaling} is determined according to the high-layer signaling.

Herein, L is a positive integer. The numbers of downlink signalings in the K downlink signaling groups are $Q_1, \ldots, Q_K$ respectively. The K downlink signaling groups and the K radio signal groups are in one-to-one correspondence. The downlink signaling in the downlink signaling group and the radio signal in the corresponding radio signal group are in one-to-one correspondence. The downlink signaling includes scheduling information of the corresponding radio signal, and the scheduling information includes at least one of {MCS, NDI, RV, TBS}.

In one embodiment, the above UE is characterized in that the K radio signal groups are transmitted in K time windows on one same carrier respectively, and any two time windows of the K time windows are orthogonal in time domain.

In one embodiment, the above UE is characterized in that a maximum eTTI length that the radio signal associated with the HARQ-ACK information can support is related to a position of a time domain resource occupied by the uplink signaling in an LTE subframe.

In one embodiment, the above UE is characterized in that the downlink signaling is a physical layer signaling, and the downlink signaling further includes HARQ auxiliary information. The given HARQ auxiliary information indicates a cumulative number of the downlink signaling associated with the radio signal in a target time window set and DCIs indicating SPS release. The target time window set is a set of all the time windows having an end time not later than an end time of a given time window in the L time windows, and the given time window is a time window occupied by the HARQ auxiliary information.

The present disclosure provides a base station device supporting short-latency radio communications. The base station device includes the following modules:

a second transmitting module, to transmit K radio signal groups, K being a positive integer greater than 1; and a second receiving module, to receive an uplink signaling, the uplink signaling including HARQ-ACK information.

Herein, lengths of eTTIs corresponding to the K radio signal groups correspond to K time lengths respectively, and any two time lengths of the K time lengths are not equal. The HARQ-ACK information indicates whether a coding block in the K radio signal groups is correctly decoded; the numbers of radio signals in the K radio signal groups are $Q_1, \ldots, Q_K$ respectively, the $Q_1, \ldots, Q_K$ being positive integers respectively.

In one embodiment, the above base station device is characterized in that the second transmitting module is further configured to perform at least one of the following:

transmitting K downlink signaling groups in L time windows; and transmitting a high-layer signaling, wherein at least the former one of {a length of the time interval occupied by the uplink signaling, a time domain resource occupied by the uplink signaling} is determined according to the high-layer signaling;

Herein, L is a positive integer. The numbers of downlink signalings in the K downlink signaling groups are $Q_1, \ldots, Q_K$ respectively. The K downlink signaling groups and the K radio signal groups are in one-to-one correspondence; and the downlink signaling in the downlink signaling group and the radio signal in the corresponding radio signal group are in one-to-one correspondence. The downlink signaling includes scheduling information of the corresponding radio signal, and the scheduling information includes at least one of {MCS, NDI, RV, TBS}.

In one embodiment, the above base station device is characterized in that the downlink signaling is a physical layer signaling, and the downlink signaling further includes HARQ auxiliary information. The given HARQ auxiliary information indicates a cumulative number of the downlink signaling associated with the radio signal in a target time window set and DCIs indicating SPS release. The target time window set is a set of all the time windows having an end time not later than an end time of a given time window in the L time windows, and the given time window is a time window occupied by the HARQ auxiliary information.

In one embodiment, the above base station device is characterized in that the K radio signal groups are transmitted in K time windows on one same carrier respectively, and any two time windows of the K time windows are orthogonal in time domain.

In one embodiment, the above base station device is characterized in that a maximum eTTI length that the radio signal associated with the HARQ-ACK information can support is related to a position of a time domain resource occupied by the uplink signaling in an LTE subframe.

Compared with the prior art, the present disclosure has the following technical benefits.

The downlink data associated with the HARQ-ACK in an uplink signaling can correspond to various eTTI lengths. The present disclosure avoids the occurrence that the UE transmits multiple uplink signalings simultaneously and improves the robustness of HARQ-ACK under power limited conditions.

The time window occupied by the downlink signaling associated with the HARQ-ACK information is determined by default (that is, signaling configuration is not required). Compared with the method in which the time window is configured through a high-layer signaling or physical layer signaling, the above aspect reduces radio overhead and increases transmission efficiency.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the present disclosure and the characteristics of the embodiments may be arbitrarily combined if there is no conflict.

Embodiment 1

Figure 1:
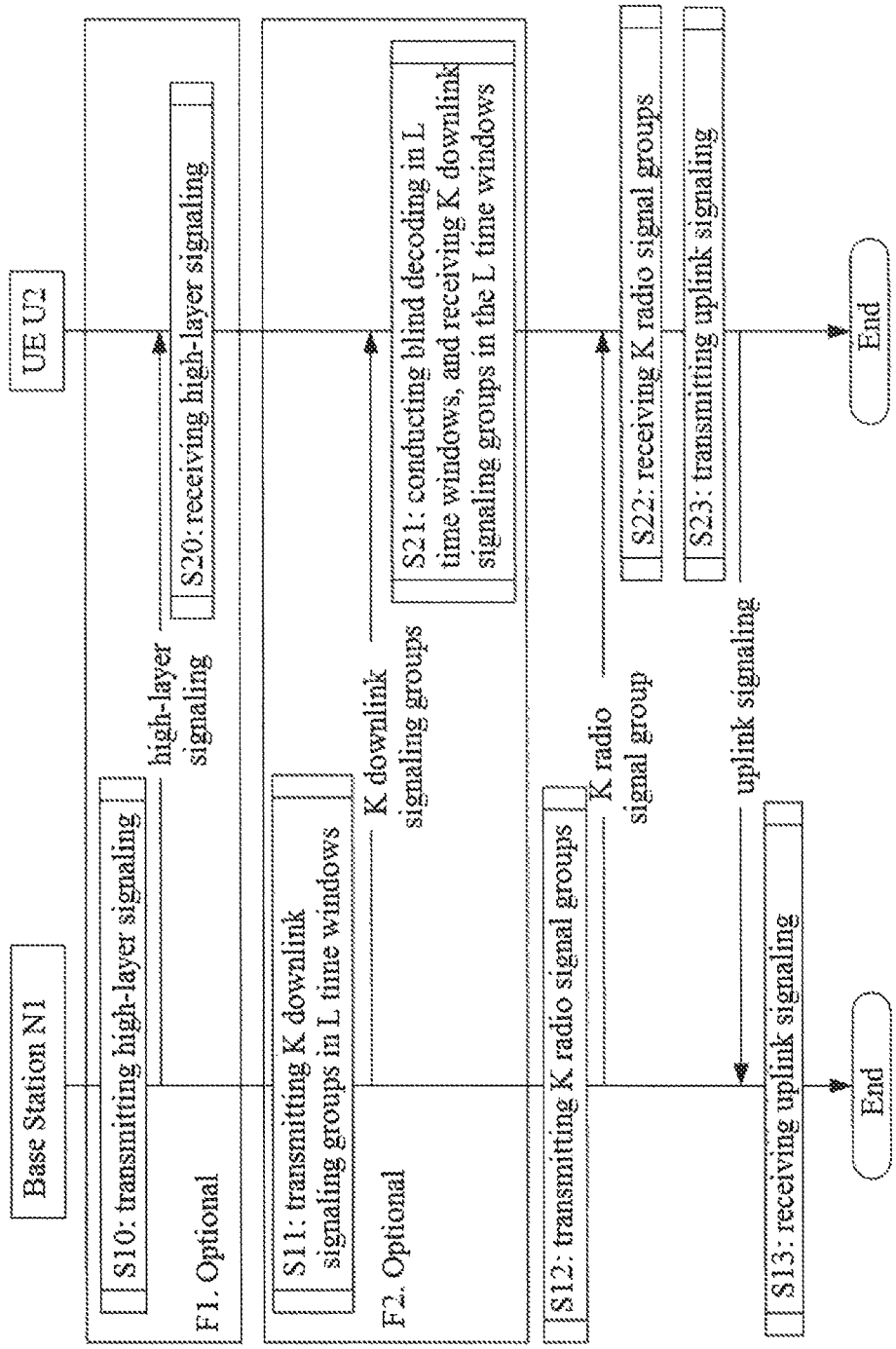
FIG. 1 is a flowchart of the transmission of a downlink data according to one embodiment of the present disclosure.

Embodiment 1 illustrates an example of a flowchart of the transmission of a downlink data, as shown in FIG. 1. In FIG. 1, the base station N1 is a maintenance base station for a serving cell of the UE U2, and the step marked in box F1 and the step marked in the box F2 are optional.

The base station N1 transmits a high-layer signaling in S10, transmits K downlink signaling groups in L time windows in S11, transmits K radio signal groups in S12, and receives an uplink signaling in S13, K being a positive integer greater than 1 and the uplink signaling including HARQ-ACK information.

The UE U2 receives the high-layer signaling in S20, conducts blind decoding in L time windows and receives the K downlink signaling groups in the L time windows in S21, receives the K radio signal groups in S22, and transmits the uplink signaling in S23.

In Embodiment 1, at least the former one of {a length of the time interval occupied by the uplink signaling, a time domain resource occupied by the uplink signaling} is determined according to the high-layer signaling. L is a positive integer. The numbers of downlink signalings in the K downlink signaling groups are $Q_1, \ldots, Q_K$ respectively. The K downlink signaling groups and the K radio signal groups are in one-to-one correspondence. The downlink signaling in the downlink signaling group and the radio signal in the corresponding radio signal group are in one-to-one correspondence. The downlink signaling includes scheduling information of the corresponding radio signal, and the scheduling information includes at least one of {MCS, NDI, RV, TBS}. Lengths of eTTIs corresponding to the K radio signal groups correspond to K time lengths respectively, and any two time lengths of the K time lengths are not equal. The HARQ-ACK information indicates whether a coding block in the K radio signal groups is correctly decoded. The numbers of radio signals in the K radio signal groups are $Q_1, \ldots, Q_K$ respectively, the $Q_1, \ldots, Q_K$ being positive integers respectively.

In one subembodiment, the UE2 works in a Frequency Division Duplex (FDD) mode, the UE2 works in a single-carrier mode, the $Q_1, \ldots, Q_K$ are all 1, that is, the radio signal group includes only one radio signal.

In one subembodiment, the HARQ-ACK information is transmitted on a physical layer control channel (which cannot be used for transmitting an uplink data).

In one subembodiment, the length of the eTTI is not greater than 1 ms but not less than 2192 Ts, the Ts being 1/30720 ms.

In one subembodiment, the time domain resource occupied by the uplink signaling is less than or equal to 0.5 ms, the time domain resource occupied by the uplink signaling is located in one LTE subframe, a maximum eTTI length that the radio signal associated with the HARQ-ACK information can support is related to the position of the time domain resource occupied by the uplink signaling in the LTE subframe.

Embodiment 2

Figure 2:
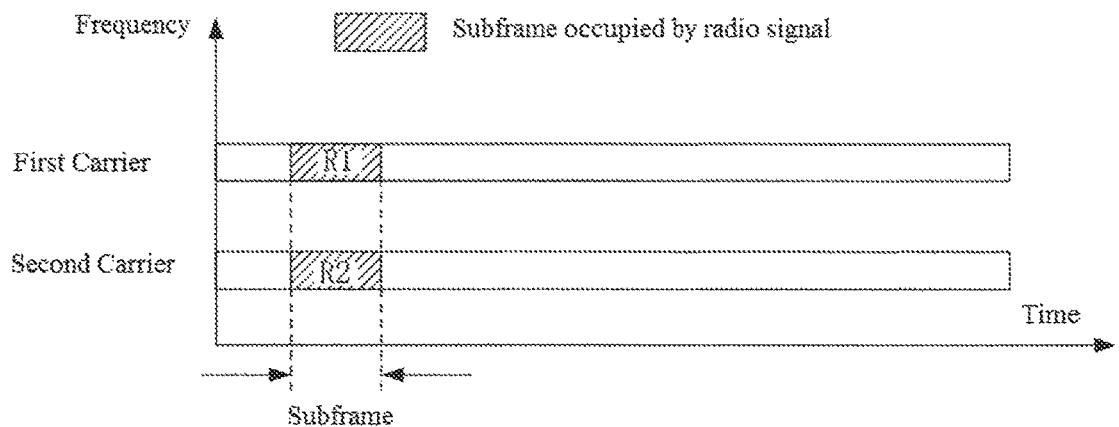
FIG. 2 is a diagram illustrating two radio signals in a radio signal group being transmitted on two carriers respectively according to one embodiment of the present disclosure.

Embodiment 2 illustrates an example of a diagram of two radio signals in a radio signal group being transmitted on two carriers respectively, as shown in FIG. 2. In FIG. 2, the rectangle filled by slashes represents an LTE subframe occupied by a radio signal.

In Embodiment 2, two radio signals R1 and R2 belonging to one same radio signal group are transmitted on a first carrier and a second carrier respectively, and the two radio signals are transmitted in one same LTE subframe. The eTTIs corresponding to the two radio signals have the same time length.

In one subembodiment, the two radio signals correspond to one same eTTI.

In one subembodiment, the two radio signals correspond to different eTTIs, and the eTTIs corresponding to the two radio signals have time lengths less than or equal to 0.5 ms.

In one subembodiment, the radio signal R1 and the radio signal R2 occupy part OFDM symbols in the LTE subframe respectively.

Embodiment 3

Figure 3:
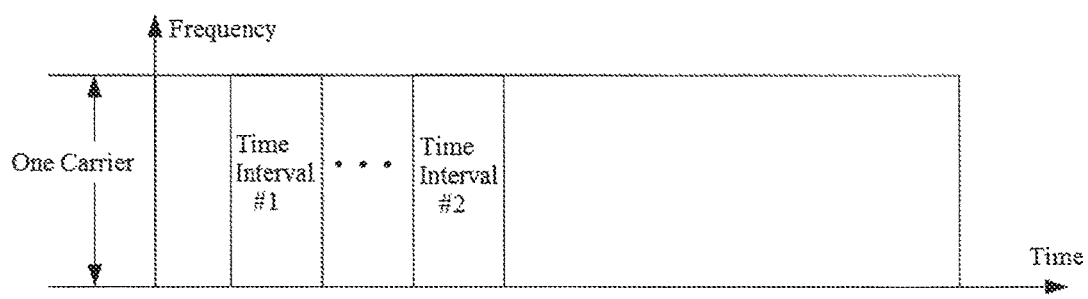
FIG. 3 is a diagram illustrating two radio signals in a radio signal group being transmitted in two orthogonal time intervals respectively according to one embodiment of the present disclosure.

Embodiment 3 illustrates an example of a diagram of two radio signals in a radio signal group being transmitted in two orthogonal time intervals respectively, as shown in FIG. 3.

In Embodiment 3, two radio signals belonging to one same radio signal group are transmitted in a time interval #1 and a time interval #2 respectively.

In one subembodiment, in a Time Division Duplex (TDD) mode, the eTTIs corresponding to the two radio signals have time lengths equal to 1 ms or less than 1 ms.

In one subembodiment, in an FDD mode, the eTTIs corresponding to the two radio signals have time lengths equal to or not greater than 0.5.

In one subembodiment, the time interval #1 and the time interval #2 are consecutive (that is, there is no gap between the time interval #1 and the time interval #2).

Embodiment 4

Figure 4:
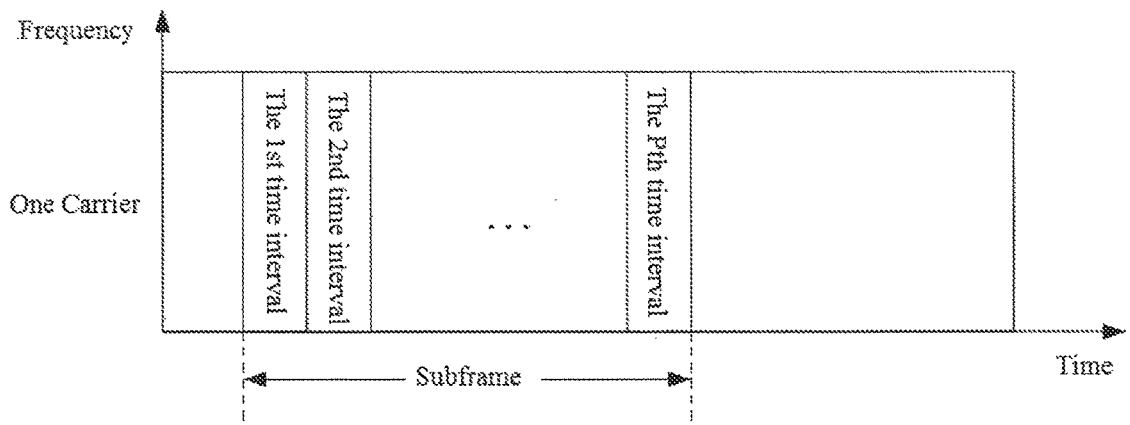
FIG. 4 is a diagram illustrating a time interval that can be used for an uplink signaling according to one embodiment of the present disclosure.

Embodiment 4 illustrates an example of a diagram of a time interval that can be used for an uplink signaling, as shown in FIG. 4.

In Embodiment 4, one LTE subframe includes P time intervals, for example, the first time interval, . . . , the Pth time interval shown in FIG. 4, P being a positive integer greater than 1. The P time intervals can all be used for transmitting the uplink signaling in the present disclosure.

In one subembodiment, P is one of {2, 4, 7, 14}.

Embodiment 5

Figure 5:
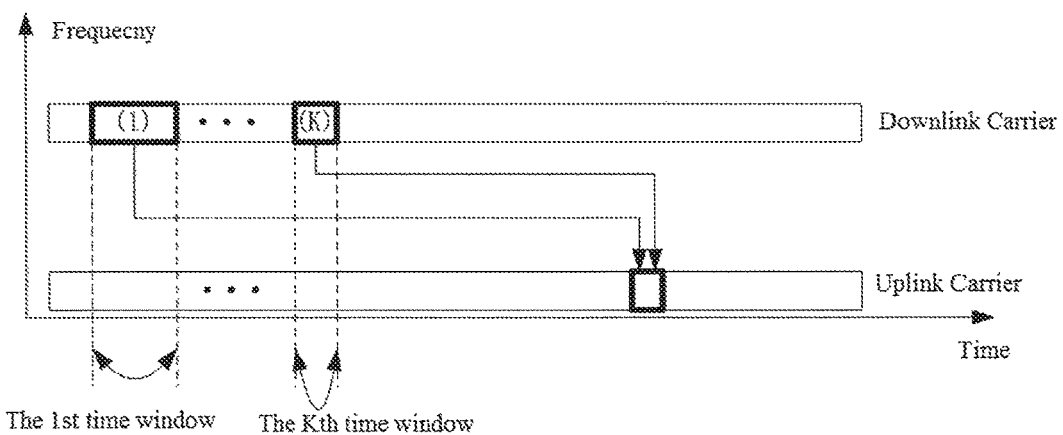
FIG. 5 is a diagram illustrating a radio signal being associated with a HARQ-ACK according to one embodiment of the present disclosure.

Embodiment 5 illustrates an example of a diagram of a radio signal being associated with a HARQ-ACK, as shown in FIG. 5. In FIG. 5, bold line boxes (1), . . . , (K) represent time domain resources occupied by K radio signal groups respectively, and the K radio signal groups are transmitted in K time windows respectively, for example, the first time window, . . . , the Kth time window shown in FIG. 5.

Whether a transport block in the K radio signal groups is correctly decoded is indicated by the HARQ-ACK information in an UCI. The UCI is transmitted on an uplink carrier, for example, the bold line box on the uplink carrier shown in FIG. 5.

In one subembodiment, in the K radio signal groups, an eTTI length corresponding to a radio signal group transmitted earlier is greater than an eTTI length corresponding to a radio signal group transmitted later.

In one subembodiment, the base station transmits a high-layer signaling to the UE, the high-layer signaling indicates the P, and the length of the time interval occupied by the uplink signaling of the present disclosure is determined according to the high-layer signaling.

Embodiment 6

Figure 6:
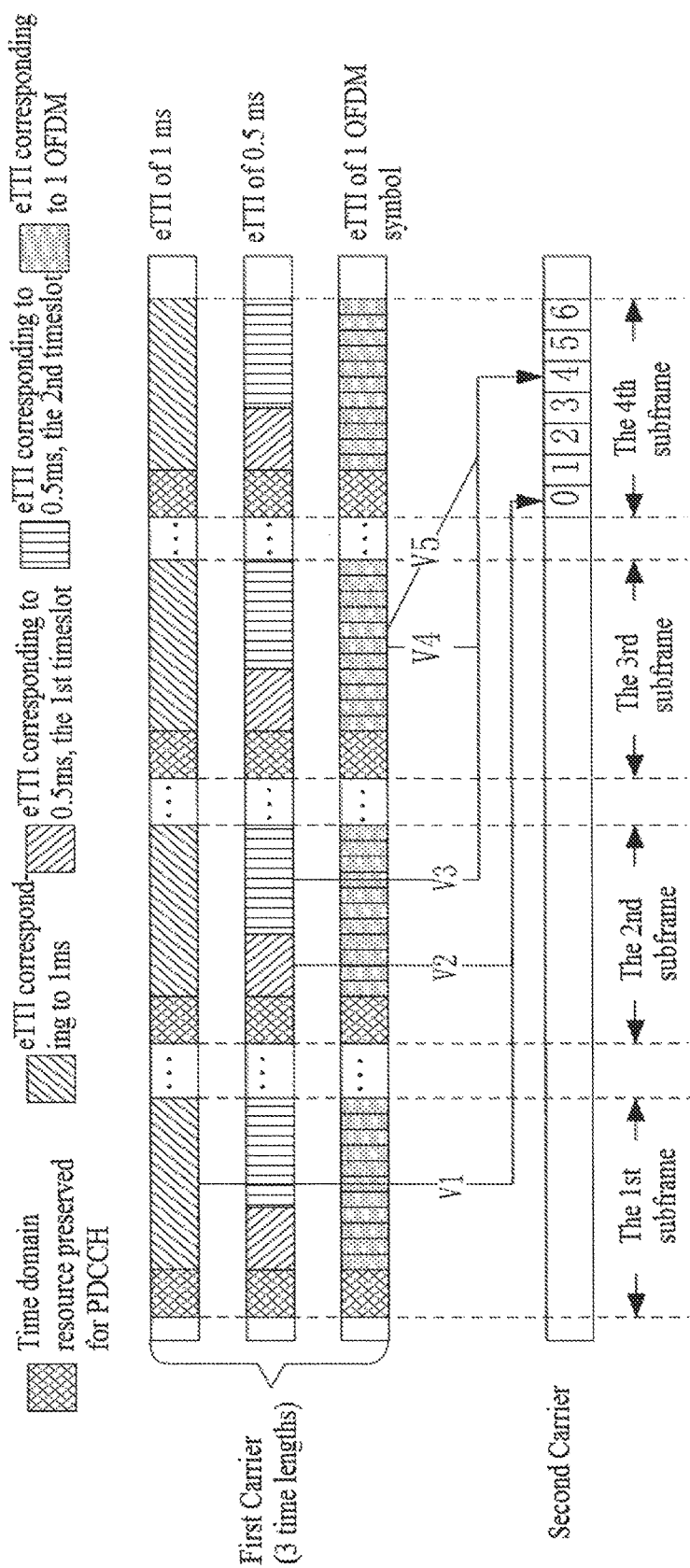
FIG. 6 is a diagram illustrating a radio signal being associated with a HARQ-ACK according to another embodiment of the present disclosure.

Embodiment 6 illustrates an example of a diagram of a radio signal being associated with a HARQ-ACK, as shown in FIG. 6. In FIG. 6, the square filled by crossed lines represents the time domain resource occupied by a PDCCH (it occupies 3 OFDM symbols in an LTE subframe); the radio signal transmitted on the time domain resource marked by slashes corresponds to an eTTI of 1 ms; the radio signal transmitted on the time domain resource marked by back-lashes or vertical lines corresponds to an eTTI of 0.5 ms, wherein the backslashes correspond to a first timeslot (the former one timeslot) in the LTE subframe and the vertical lines correspond to a second timeslot (the latter one timeslot) in the LTE subframe; the radio signal transmitted on the time domain resource marked by black dots corresponds to an eTTI of one OFDM symbol. In FIG. 6, the first carrier is a downlink carrier, and the second carrier is an uplink carrier.

In Embodiment 6, the UE supports eTTIs of three lengths on the first carrier, that is, 1 ms, 0.5 ms, and one OFDM symbol. Correspondingly, an uplink signaling occupies a time interval of 2 SC-FDMA symbols, that is, one subframe of the second carrier includes seven time intervals, which are 0, 1, . . . , 6 as shown in FIG. 6 respectively.

In one subembodiment, for the radio signal transmitted in the first subframe of the first carrier and corresponding to the eTTI of 1 ms, the corresponding HARQ-ACK information is transmitted in the first time interval (time interval 0) in the fourth subframe, as indicated by arrow V1. For the radio signal transmitted in the first timeslot of the second subframe of the first carrier and corresponding to the eTTI of 0.5 ms, the corresponding HARQ-ACK information is transmitted in the first time interval (time interval 0) in the fourth subframe, as indicated by arrow V2.

In one subembodiment, for the radio signal transmitted in the second timeslot of the second subframe of the first carrier and corresponding to the eTTI of 0.5 ms, the corresponding HARQ-ACK information is transmitted in the fifth time interval (time interval 4) in the fourth subframe, as indicated by arrow V3. For the radio signal transmitted in the ninth and tenth OFDM symbols of the third subframe of the first carrier and corresponding to the eTTI of 1 OFDM symbol, the corresponding HARQ-ACK information is transmitted in the fifth time interval (time interval 4) in the fourth subframe, as indicated by arrows V4 and V5.

In one subembodiment, the subframe index of the first subframe is n1, and the subframe index of the fourth subframe is n1+4.

In one subembodiment, the subframe index of the second subframe is n2, and the subframe index of the fourth subframe is n2+2.

In one subembodiment, the subframe index of the third subframe is n3, and the subframe index of the fourth subframe is n3+1.

In one subembodiment, the uplink signaling of the present disclosure is transmitted in the time interval 0. The UE conducts blind decoding in L time windows, and receives the K downlink signaling groups of the present disclosure in the L time windows. The L time windows include a first time window and a second time window, and the first time window and the second time window are transmitted in the first subframe and the second subframe shown in FIG. 6 respectively. L and K are both equal to 2, and the $Q_1, \ldots, Q_K$ of the present disclosure are all equal to 1. The K downlink signaling groups and the K radio signal groups of the present disclosure are in one-to-one correspondence; and the downlink signaling in the downlink signaling group and the radio signal in the corresponding radio signal group are in one-to-one correspondence. The K downlink signaling groups include a first signaling group and a second signaling group. The K radio signal groups include a first radio signal group and a second radio signal group. The first signaling group and the second signaling group include a first signaling and a second signaling respectively. The first radio signal group and the second radio signal group include a first radio signal (as indicated by the start end of the arrow V1) and a second radio signal (as indicated by the start end of the arrow V2) respectively. The first signaling is transmitted in the first time window, and the second signaling is transmitted in the second time window. The first signaling and the second signaling include the scheduling information of the first radio signal and the scheduling information of the second radio signal respectively. The scheduling information includes at least one of {MCS, NDI, RV, TBS}. The first signaling and the second signaling are both physical layer signalings. The first signaling and the second signaling further include HARQ auxiliary information. The HARQ auxiliary information in the first signaling indicates a cumulative number (being 1) of the downlink signaling (transmitted by the base station) associated with the radio signal in the first time window and DCIs indicating SPS release. The HARQ auxiliary information in the second signaling indicates a cumulative number (being 2) of the downlink signaling (transmitted by the base station) associated with the radio signal in the first time window and the second time window and DCIs indicating SPS release.

In one subembodiment, the uplink signaling of the present disclosure is transmitted in the time interval 4. The UE conducts blind decoding in L time windows, and receives the K downlink signaling groups of the present disclosure in the L time windows. The L time windows include a third time window and a fourth time window, and the third time window and the fourth time window are transmitted in the second subframe and the third subframe shown in FIG. 6 respectively. L and K are both equal to 2, and the $Q_1$ and $Q_K$ of the present disclosure are equal to 1 and 2 respectively. The K downlink signaling groups and the K radio signal groups of the present disclosure are in one-to-one correspondence; and the downlink signaling in the downlink signaling group and the radio signal in the corresponding radio signal group are in one-to-one correspondence. The K downlink signaling groups include a third signaling group and a fourth signaling group. The K radio signal groups include a third radio signal group and a fourth radio signal group. The third signaling group includes a third signaling, and the fourth signaling group includes a fourth signaling and a fifth signaling. The third radio signal group includes a third radio signal (as indicated by the start end of the arrow V3), and the fourth radio signal group includes a fourth radio signal (as indicated by the start end of the arrow V4) and a fifth radio signal (as indicated by the start end of the arrow V5). The third signaling is transmitted in the third time window, and the fourth signaling and the fifth signaling are transmitted in the fourth time window. The third signaling, the fourth signaling and the fifth signaling include the scheduling information of the third radio signal, the scheduling information of the fourth radio signal, and the scheduling information of the fifth radio signal respectively. The scheduling information includes at least one of {MCS, NDI, RV, TBS}. The third signaling, the fourth signaling, and the fifth signaling are all physical layer signalings. The third signaling, the fourth signaling, and the fifth signaling further include HARQ auxiliary information. The HARQ auxiliary information in the third signaling indicates a cumulative number (being 1) of the downlink signaling (transmitted by the base station) associated with the radio signal in the third time window and DCIs indicating SPS release. The HARQ auxiliary information in the fourth signaling indicates a cumulative number (being 3) of the downlink signaling (transmitted by the base station) associated with the radio signal in the third time window and the fourth time window and DCIs indicating SPS release. The HARQ auxiliary information in the fifth signaling indicates is the same as the HARQ auxiliary information in the fourth signaling.

According to the above subembodiments, a maximum eTTI length that the radio signal associated with the HARQ-ACK information can support is related to a position of a time domain resource occupied by the uplink signaling in the LTE subframe. That is, the maximum eTTI length associated with the HARQ-ACK information in the time interval 0 is 1 ms, the maximum eTTI length associated with the HARQ-ACK information in the time interval 4 is 0.5 ms, and the maximum eTTI length associated with the HARQ-ACK information in the time intervals {1, 2, 3, 5, 6} is less than 0.5 ms.

Embodiment 7

Figure 7:
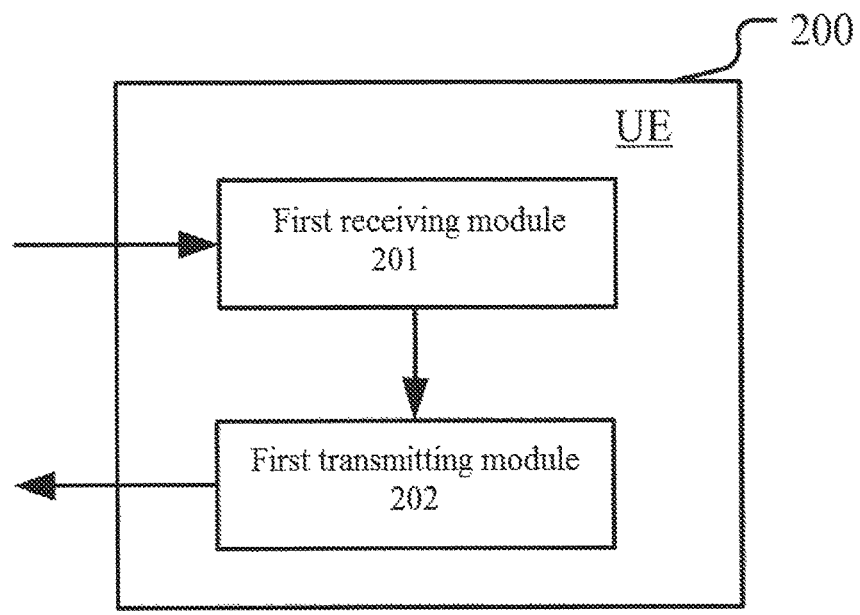
FIG. 7 is a structure block diagram illustrating a processing device in a UE according to one embodiment of the present disclosure.

Embodiment 7 illustrates a structure block diagram of a processing device in a UE, as shown in FIG. 7. In FIG. 7, the processing device 200 is mainly composed of a first receiving module 201 and a first transmitting module 202.

The first receiving module 201 receives K radio signal groups, K being a positive integer greater than 1. The first transmitting module 202 transmits an uplink signaling, the uplink signaling including HARQ-ACK information;

In Embodiment 7, lengths of eTTIs corresponding to the K radio signal groups correspond to K time lengths respectively, and any two time lengths of the K time lengths are not equal. The HARQ-ACK information indicates whether a coding block in the K radio signal groups is correctly decoded. The numbers of radio signals in the K radio signal groups are $Q_1, \ldots, Q_K$ respectively, the $Q_1, \ldots, Q_K$ being positive integers respectively. The uplink signaling is an UCI.

In one subembodiment, the first receiving module 201 performs:

conducting blind decoding in L time windows, and receiving K downlink signaling groups in the L time windows; and receiving a high-layer signaling, wherein at least the former one of {a length of the time interval occupied by the uplink signaling, a time domain resource occupied by the uplink signaling} is determined according to the high-layer signaling.

Herein, L is a positive integer. The numbers of downlink signalings in the K downlink signaling groups are $Q_1, \ldots, Q_K$ respectively. The K downlink signaling groups and the K radio signal groups are in one-to-one correspondence. The downlink signaling in the downlink signaling group and the radio signal in the corresponding radio signal group are in one-to-one correspondence. The downlink signaling includes scheduling information of the corresponding radio signal, and the scheduling information includes at least one of {MCS, NDI, RV, TBS}.

In one subembodiment, a maximum eTTI length that the radio signal associated with the HARQ-ACK information can support is related to a position of a time domain resource occupied by the uplink signaling in an LTE subframe.

Embodiment 8

Figure 8:
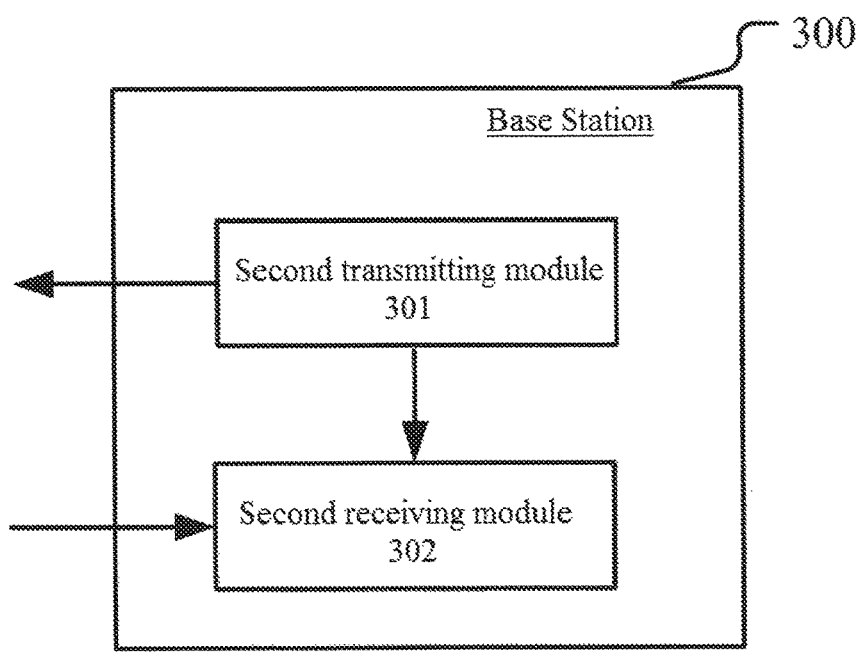
FIG. 8 is a structure block diagram illustrating a processing device in a base station according to one embodiment of the present disclosure.

Embodiment 8 illustrates a structure block diagram of a processing device in a base station, as shown in FIG. 8. In FIG. 8, the processing device 300 is mainly composed of a second transmitting module 301 and a second receiving module 302.

The second transmitting module 301 transmits K radio signal groups, K being a positive integer greater than 1. The second receiving module 302 receives an uplink signaling, the uplink signaling including HARQ-ACK information;

In Embodiment 8, lengths of eTTIs corresponding to the K radio signal groups correspond to K time lengths respectively, and any two time lengths of the K time lengths are not equal. The HARQ-ACK information indicates whether a coding block in the K radio signal groups is correctly decoded. The numbers of radio signals in the K radio signal groups are $Q_1, \ldots, Q_K$ respectively, the $Q_1, \ldots, Q_K$ being positive integers respectively. The transmission channel corresponding to the radio signal is a DL-SCH.

In one subembodiment, the second transmitting module 301 performs:

transmitting K downlink signaling groups in L time windows; and transmitting a high-layer signaling, wherein at least the former one of {a length of the time interval occupied by the uplink signaling, a time domain resource occupied by the uplink signaling} is determined according to the high-layer signaling.

Herein, L is a positive integer. The numbers of downlink signalings in the K downlink signaling groups are $Q_1, \ldots, Q_K$ respectively. The K downlink signaling groups and the K radio signal groups are in one-to-one correspondence. The downlink signaling in the downlink signaling group and the radio signal in the corresponding radio signal group are in one-to-one correspondence. The downlink signaling includes scheduling information of the corresponding radio signal, and the scheduling information includes at least one of {MCS, NDI, RV, TBS}.

Embodiment 9

Figure 9:
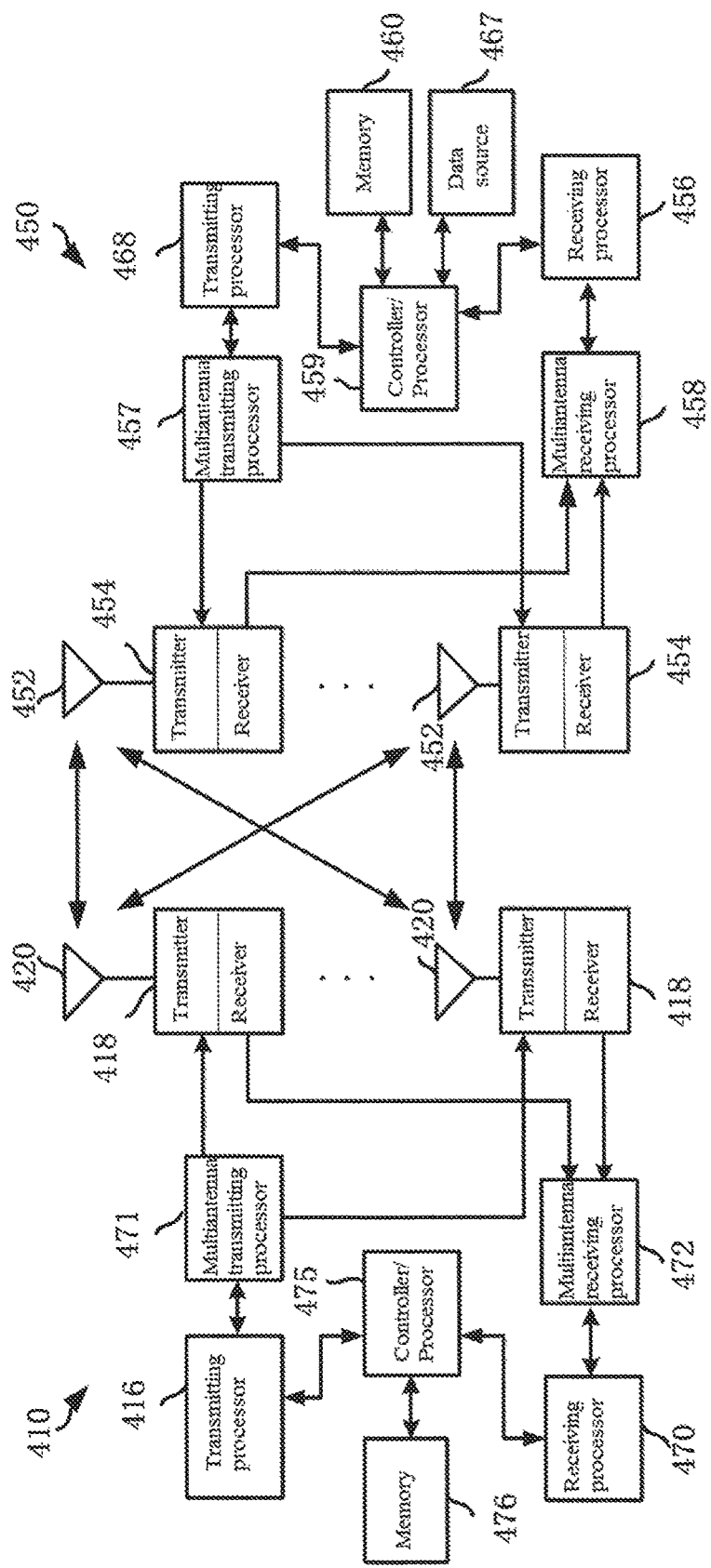
FIG. 9 is a diagram illustrating an evolved node B and a UE according to one embodiment of the present disclosure.

Embodiment 9 illustrates a diagram of an NR node and a UE, as shown in FIG. 9. FIG. 9 is a block diagram of a UE 450 and a gNB 410 that are in communication with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and antenna 452.

In Downlink (DL) transmission, at the gNB 410, a higher-layer packet from a core network is provided to the controller/processor 475. The controller/processor 475 provides a function of a layer 2. In downlink transmission, the controller/processor 475 provides header compression, encryption, packet segmentation and reordering, multiplexing between a logical channel and a transport channel, and a resource allocation for the UE 450 based on various priorities. The controller/processor 475 is also in charge of HARQ operation, retransmission of a lost packet, and a signaling to the UE450. The transmitting processor 416 and the multi-antenna transmitting processor 471 performs signal processing functions used for a layer 1 (that is, physical layer). The transmitting processor 416 performs encoding and interleaving so as to ensure a FEC (Forward Error Correction) and the mapping to signal clusters corresponding to each modulation scheme (i.e., BPSK, QPSK, M-QAM, etc.) at the UE 450 side. The multi-antenna transmitting processor 471 processes the encoded and modulated symbols by a digital spatial precoding/beamforming operation to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In downlink transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform signal processing functions for the layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In the frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of the layer 2. The controller/processor 459 can be connected to a memory 460 that stores program code and data. The memory 460 is a computer readable media. In downlink transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above layer 2, or various control signals can be provided to the layer 3 for processing. The controller/processor 459 can also perform error detection using ACK and/or NACK protocols to support the HARQ operation.

In the uplink transmission, at the UE 450, the data source 467 provides a higher-layer packet to the controller/processor 459. The data source 467 expresses all protocol layers above the L2 layer. Similar as the transmitting function of the gNB 410 described in downlink transmission, the controller/processor 459 provides header compression, encryption, packet segmentation and reordering, and multiplexing between a logical channel and a transport channel based on the radio resource allocation of the base station 410 so as to provide the functions of the layer 2 used for the control plane and user plane. The controller/processor 459 is in also charge of HARQ operation, retransmission of a lost packet, and signaling to the gNB 410. The transmitting processor 468 conducts modulation mapping and channel encoding processing; the multi-antenna transmitting processor 457 performs digital multi-antenna spatial precoding/beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In uplink transmission, the function of the gNB 410 is similar as the receiving function of the UE 450 described in the downlink transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of the layer 1. The controller/processor 475 provides functions of the layer 2. The controller/processor 475 can be connected to a memory 476 that stores program code and data. The memory 476 is a computer readable media. In uplink transmission, the controller/processor 475 provides de-multiplexing between the transport channel and the logical channel, packet reassembling, decryption, header decompression, and control signal processing so as to recover a higher-layer packet coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes a memory that stores a computer readable instruction program. The computer readable instruction program generates an action when executed by at least one processor. The action includes: receiving K radio signal groups, K being a positive integer greater than 1; and transmitting an uplink signaling, the uplink signaling including HARQ-ACK information; wherein lengths of eTTIs corresponding to the K radio signal groups correspond to K time lengths respectively, and any two time lengths of the K time lengths are not equal; the HARQ-ACK information indicates whether a coding block in the K radio signal groups is correctly decoded; the numbers of radio signals in the K radio signal groups are $Q_1, \ldots, Q_K$ respectively, the $Q_1, \ldots, Q_K$ being positive integers respectively; and, in the K radio signal groups, an eTTI length corresponding to a radio signal group transmitted earlier is greater than an eTTI length corresponding to a radio signal group transmitted later.

In one embodiment, the gNB 410 includes a memory that stores a computer readable instruction program. The computer readable instruction program generates an action when executed by at least one processor. The action includes: transmitting K radio signal groups, K being a positive integer greater than 1; and receiving an uplink signaling, the uplink signaling including HARQ-ACK information; wherein lengths of eTTIs corresponding to the K radio signal groups correspond to K time lengths respectively, and any two time lengths of the K time lengths are not equal; the HARQ-ACK information indicates whether a coding block in the K radio signal groups is correctly decoded; the numbers of radio signals in the K radio signal groups are $Q_1, \ldots, Q_K$ respectively, the $Q_1, \ldots, Q_K$ being positive integers respectively; and, in the K radio signal groups, an eTTI length corresponding to a radio signal group transmitted earlier is greater than an eTTI length corresponding to a radio signal group transmitted later.

In one embodiment, the UE 450 corresponds to the UE in the present disclosure.

In one embodiment, the gNB 410 corresponds to the base station in the present disclosure.

In one embodiment, the first receiving module 201 in Embodiment 7 includes {the antenna 452, the transmitter 454, the receiving processor 456, the controller/processor 459}.

In one embodiment, the first receiving module 201 in Embodiment 7 includes the multi-antenna receiving processor 458.

In one embodiment, the first transmitting module 202 in Embodiment 7 includes {the antenna 452, the transmitter 454, the transmitting processor 468}.

In one embodiment, the first transmitting module 202 in Embodiment 7 includes the multi-antenna transmitting processor 457.

In one embodiment, the second transmitting module 301 in Embodiment 8 includes {the antenna 420, the transmitter 418, the transmitting processor 415}.

In one embodiment, the second transmitting module 301 in Embodiment 8 includes the multi-antenna transmitting processor 471.

In one embodiment, the second receiving module 302 in Embodiment 8 includes {the antenna 420, the receiver 428, the receiving processor 470}.

In one embodiment, the second receiving module 302 in Embodiment 8 includes the multi-antenna receiving processor 472.

The ordinary skill in the art may understand that all or part of the steps in the above method may be implemented by instructing related hardware through a program. The program may be stored in a computer readable storage medium, for example Read-Only Memory (ROM), hard disk or compact disc, etc. Optionally, all or part of the steps in the above embodiments may also be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure include but not limited to mobile phones, tablet computers, notebooks, network cards, vehicle-mounted communication equipment, wireless sensor and other wireless communication equipment. The base station in the present disclosure includes but not limited to macro-cellular base stations, micro-cellular base stations, home base stations, relay base station and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) supporting short-latency radio communications, comprising:
receiving K radio signal groups, K being a positive integer greater than 1;

transmitting a single uplink signaling related to correct decoding of the received K radio signal groups, the single uplink signaling comprising HARQ-ACK information; wherein:
  the K radio signal groups are received in K time windows on a same carrier, and any two time windows of the K time windows are orthogonal in the time domain;
  lengths of Enhanced Transmission Time Intervals (eTTIs) corresponding to the K radio signal groups correspond to K time lengths respectively, and any two time lengths of the K time lengths are not equal;
  the HARQ-ACK information indicates whether a coding block in each of the K radio signal groups is correctly decoded;
  the number of radio signals in the K radio signal groups are $Q_1, \ldots, Q_K$ respectively, the $Q_1, \ldots, Q_K$ being positive integers respectively; and
  in the K radio signal groups that are associated with the uplink signaling, an eTTI length corresponding to a radio signal group transmitted earlier is greater than an eTTI length corresponding to a radio signal group transmitted later.

2. The method according to claim 1, wherein the K radio signal groups are transmitted in K time windows on one same carrier respectively, and any two time windows of the K time windows are orthogonal in time domain; or, a maximum eTTI length that the radio signal associated with the HARQ-ACK information can support is related to a position of a time domain resource occupied by the uplink signaling in an LTE subframe; or, a minimum eTTI length that the radio signal associated with the HARQ-ACK information can support is not related to a position of a time interval occupied by the uplink signaling in an LTE subframe; or, the time interval occupied by the uplink signaling is the first one of the multiple time intervals that can be used for transmitting the HARQ-ACK information in the LTE subframe, and the maximum eTTI length that the radio signal associated with the HARQ-ACK information can support is 1 ms.

3. The method according to claim 1, comprising:
  conducting blind decoding in L time windows, and receiving K downlink signaling groups in the L time windows;
  wherein L is a positive integer; the number of downlink signalings in the K downlink signaling groups are $Q_1, \ldots, Q_K$ respectively; the K downlink signaling groups and the K radio signal groups are in one-to-one correspondence; the downlink signaling in the downlink signaling group and the radio signal in the corresponding radio signal group are in one-to-one correspondence; and the downlink signaling comprises scheduling information of the corresponding radio signal, and the scheduling information comprises at least one of {Modulating and Coding Status (MCS), New Data Indicator (NM), Redundancy Version (RV), and Transport Block Size (TBS)}.

4. The method according to claim 3, wherein the downlink signaling is a physical layer signaling, and the downlink signaling further comprises HARQ auxiliary information; the given HARQ auxiliary information indicates a cumulative number of the downlink signaling associated with the radio signal in a target time window set and Downlink Control Information (DCIs) indicating Semi-Persistent Scheduling (SPS) release; the target time window set is a set of all the time windows having an end time not later than an end time of a given time window in the L time windows, and the given time window is a time window occupied by the HARQ auxiliary information.

5. The method according to claim 1, comprising:
  receiving a high-layer signaling, wherein at least the former one of {a length of the time interval occupied by the uplink signaling, a time domain resource occupied by the uplink signaling} is determined according to the high-layer signaling.

6. A method in a base station supporting short-latency radio communications, comprising:
  transmitting K radio signal groups, K being a positive integer greater than 1;
  receiving a single uplink signaling related to correct decoding of the transmitted K radio signal groups, the single uplink signaling comprising HARQ-ACK information; wherein:
  the K radio signal groups are transmitted in K time windows on a same carrier, and any two time windows of the K time windows are orthogonal in the time domain;
  lengths of Enhanced Transmission Time Intervals (eTTIs) corresponding to the K radio signal groups correspond to K time lengths respectively, and any two time lengths of the K time lengths are not equal;
  the HARQ-ACK information indicates whether a coding block in each of the K radio signal groups is correctly decoded;
  the number of radio signals in the K radio signal groups are $Q_1, \ldots, Q_K$ respectively, the $Q_1, \ldots, Q_K$ being positive integers respectively; and
  in the K radio signal groups that are associated with the uplink signaling, an eTTI length corresponding to a radio signal group transmitted earlier is greater than an eTTI length corresponding to a radio signal group transmitted later.

7. The method according to claim 6, wherein the K radio signal groups are transmitted in K time windows on one same carrier respectively, and any two time windows of the K time windows are orthogonal in time domain; or, a maximum eTTI length that the radio signal associated with the HARQ-ACK information can support is related to a position of a time domain resource occupied by the uplink signaling in an LTE subframe; or, a minimum eTTI length that the radio signal associated with the HARQ-ACK information can support is not related to a position of a time interval occupied by the uplink signaling in an LTE subframe; or, the time interval occupied by the uplink signaling is the first one of the multiple time intervals that can be used for transmitting the HARQ-ACK information in the LTE subframe, and the maximum eTTI length that the radio signal associated with the HARQ-ACK information can support is 1 ms.

8. The method according to claim 6, comprising:
  transmitting K downlink signaling groups in L time windows;
  wherein L is a positive integer; the number of downlink signalings in the K downlink signaling groups are $Q_1, \ldots, Q_K$ respectively; the K downlink signaling groups and the K radio signal groups are in one-to-one correspondence; the downlink signaling in the downlink signaling group and the radio signal in the corresponding radio signal group are in one-to-one correspondence; and the downlink signaling comprises scheduling information of the corresponding radio signal, and the scheduling information comprises at least one of {Modulating and Coding Status (MCS), New Data Indicator (NDI), Redundancy Version (RV), and Transport Block Size (TBS)}.

9. The method according to claim 8, wherein the downlink signaling is a physical layer signaling, and the downlink signaling further comprises HARQ auxiliary information; the given HARQ auxiliary information indicates a cumulative number of the downlink signaling associated with the radio signal in a target time window set and Downlink Control Information (DCIs) indicating Semi-Persistent Scheduling (SPS) release; the target time window set is a set of all the time windows having an end time not later than an end time of a given time window in the L time windows, and the given time window is a time window occupied by the HARQ auxiliary information.

10. The method according to claim 6, comprising:
Step A1: transmitting a high-layer signaling, wherein at least the former one of {a length of the time interval occupied by the uplink signaling, a time domain resource occupied by the uplink signaling} is determined according to the high-layer signaling.

11. A UE supporting short-latency radio communications, comprising:
a first receiving module, to receive K radio signal groups, K being a positive integer greater than 1;
a first transmitting module, to transmit a single uplink signaling related to correct decoding of the received K radio signal groups, the single uplink signaling comprising HARQ-ACK information; wherein:
the K radio signal groups are received in K time windows on a same carrier, and any two time windows of the K time windows are orthogonal in the time domain;
lengths of Enhanced Transmission Time Intervals (eTTIs) corresponding to the K radio signal groups correspond to K time lengths respectively, and any two time lengths of the K time lengths are not equal;
the HARQ-ACK information indicates whether a coding block in each of the K radio signal groups is correctly decoded;
the number of radio signals in the K radio signal groups are $Q_1, \ldots, Q_K$ respectively, the $Q_1, \ldots, Q_K$ being positive integers respectively; and
in the K radio signal groups that are associated with the uplink signaling, an eTTI length corresponding to a radio signal group transmitted earlier is greater than an eTTI length corresponding to a radio signal group transmitted later.

12. The UE according to claim 11, wherein the first receiving module is further configured to perform at least one of the following:
conducting blind decoding in L time windows, and receiving K downlink signaling groups in the L time windows;
receiving a high-layer signaling, wherein at least the former one of {a length of the time interval occupied by the uplink signaling, a time domain resource occupied by the uplink signaling} is determined according to the high-layer signaling;
wherein L is a positive integer; the number of downlink signalings in the K downlink signaling groups are $Q_1, \ldots, Q_K$ respectively; the K downlink signaling groups and the K radio signal groups are in one-to-one correspondence; the downlink signaling in the downlink signaling group and the radio signal in the corresponding radio signal group are in one-to-one correspondence; and the downlink signaling comprises scheduling information of the corresponding radio signal, and the scheduling information comprises at least one of {Modulating and Coding Status (MCS), New Data Indicator (NDI), Redundancy Version (RV), and Transport Block Size (TBS)}.

13. The UE according to claim 11, wherein the K radio signal groups are transmitted in K time windows on one same carrier respectively, and any two time windows of the K time windows are orthogonal in time domain; or, a maximum eTTI length that the radio signal associated with the HARQ-ACK information can support is related to a position of a time domain resource occupied by the uplink signaling in an LTE subframe; or, a minimum eTTI length that the radio signal associated with the HARQ-ACK information can support is not related to a position of a time interval occupied by the uplink signaling in an LTE subframe; or, the time interval occupied by the uplink signaling is the first one of the multiple time intervals that can be used for transmitting the HARQ-ACK information in the LTE subframe, and the maximum eTTI length that the radio signal associated with the HARQ-ACK information can support is 1 ms.

14. The UE according to claim 12, wherein the downlink signaling is a physical layer signaling, and the downlink signaling further comprises HARQ auxiliary information; the given HARQ auxiliary information indicates a cumulative number of the downlink signaling associated with the radio signal in a target time window set and Downlink Control Information/DCIs) indicating Semi-Persistent Scheduling (SPS) release; the target time window set is a set of all the time windows having an end time not later than an end time of a given time window in the L time windows, and the given time window is a time window occupied by the HARQ auxiliary information.

15. A base station device supporting short-latency radio communications, comprising:
a second transmitting module, to transmit K radio signal groups, K being a positive integer greater than 1;
a second receiving module, to receive a single uplink signaling related to correct decoding of the transmitted K radio signal groups, the single uplink signaling comprising HARQ-ACK information; wherein:
the K radio signal groups are transmitted in K time windows on a same carrier, and any two time windows of the K time windows are orthogonal in the time domain;
lengths of Enhanced Transmission Time Intervals (eTTIs) corresponding to the K radio signal groups correspond to K time lengths respectively, and any two time lengths of the K time lengths are not equal;
the HARQ-ACK information indicates whether a coding block in each of the K radio signal groups is correctly decoded;
the number of radio signals in the K radio signal groups are $Q_1, \ldots, Q_K$ respectively, the $Q_1, \ldots, Q_K$ being positive integers respectively; and
in the K radio signal groups that are associated with the uplink signaling, an eTTI length corresponding to a radio signal group transmitted earlier is greater than an eTTI length corresponding to a radio signal group transmitted later.

16. The base station device according to claim 15, wherein the second transmitting module is further configured to perform at least one of the following:
transmitting K downlink signaling groups in L time windows;
transmitting a high-layer signaling, wherein at least the former one of {a length of the time interval occupied by the uplink signaling, a time domain resource occupied by the uplink signaling} is determined according to the high-layer signaling;

wherein L is a positive integer; the number of downlink signalings in the K downlink signaling groups are $Q_1, \ldots, Q_K$ respectively; the K downlink signaling groups and the K radio signal groups are in one-to-one correspondence; the downlink signaling in the downlink signaling group and the radio signal in the corresponding radio signal group are in one-to-one correspondence; and the downlink signaling comprises scheduling information of the corresponding radio signal, and the scheduling information comprises at least one of {Modulating and Coding Status (MCS), New Data Indicator (NDI), Redundancy Version (RV), and Transport Block Size (TBS)}.

17. The base station device according to claim 15, wherein the K radio signal groups are transmitted in K time windows on one same carrier respectively, and any two time windows of the K time windows are orthogonal in time domain; or, a maximum eTTI length that the radio signal associated with the HARQ-ACK information can support is related to a position of a time domain resource occupied by the uplink signaling in an LTE subframe; or, a minimum eTTI length that the radio signal associated with the HARQ-ACK information can support is not related to a position of a time interval occupied by the uplink signaling in an LTE subframe; or, the time interval occupied by the uplink signaling is the first one of the multiple time intervals that can be used for transmitting the HARQ-ACK information in the LTE subframe, and the maximum eTTI length that the radio signal associated with the HARQ-ACK information can support is 1 ms.

18. The base station device according to claim 15, wherein the second transmitting module transmits a high-layer signaling, and at least the former one of {a length of the time interval occupied by the uplink signaling, a time domain resource occupied by the uplink signaling} is determined according to the high-layer signaling.

* * * * *